Figure 5:
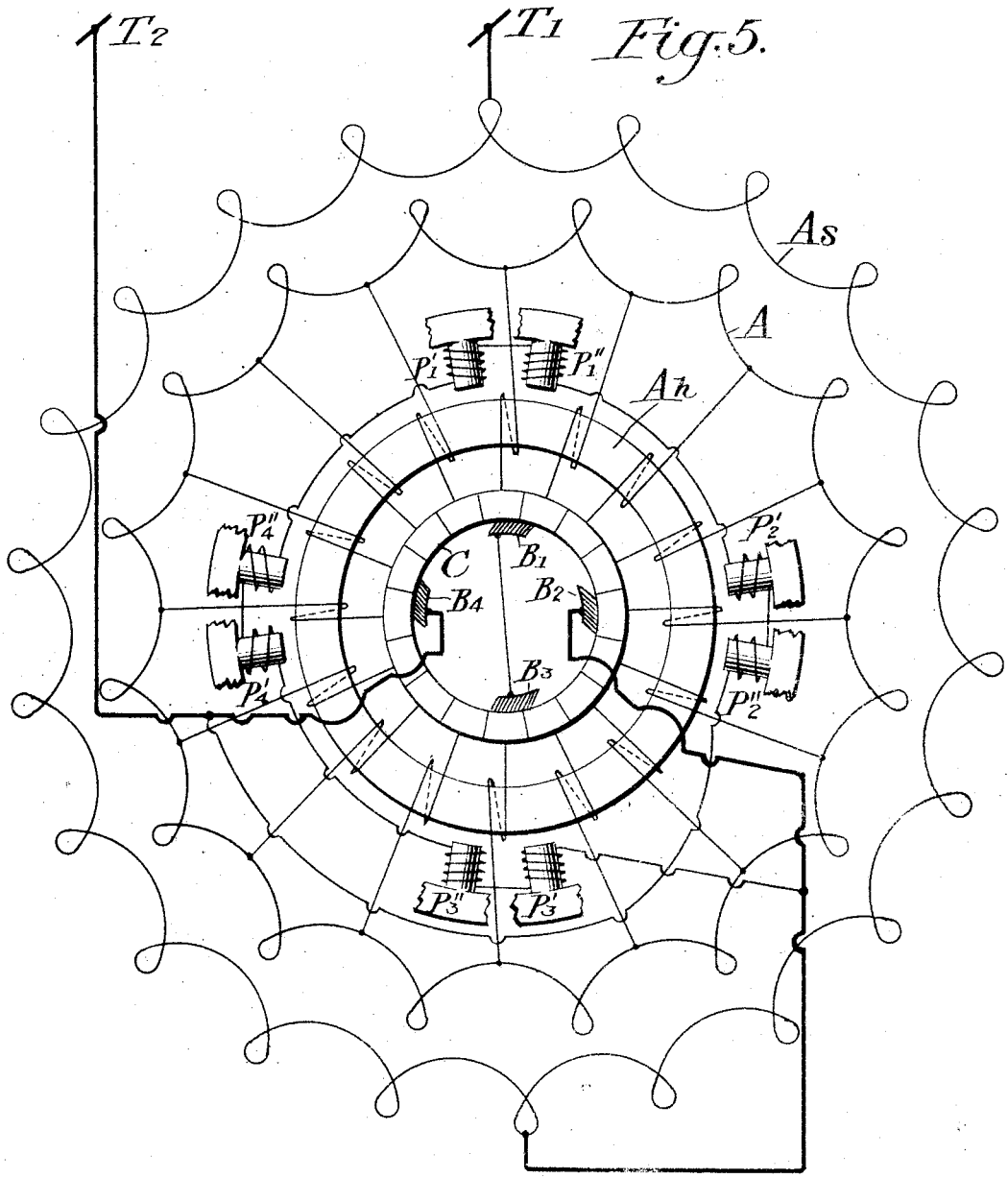

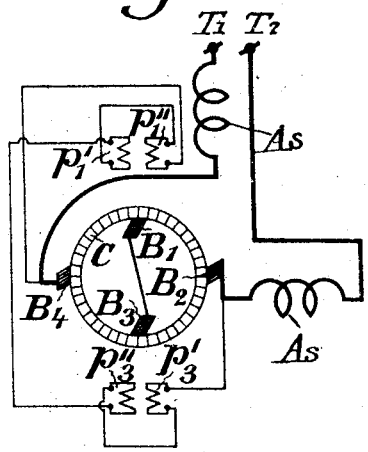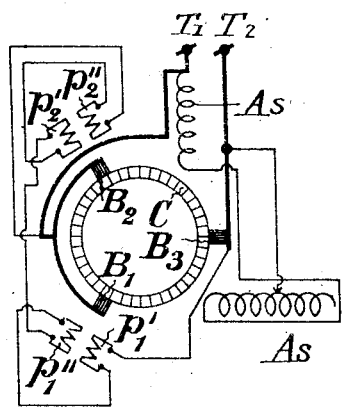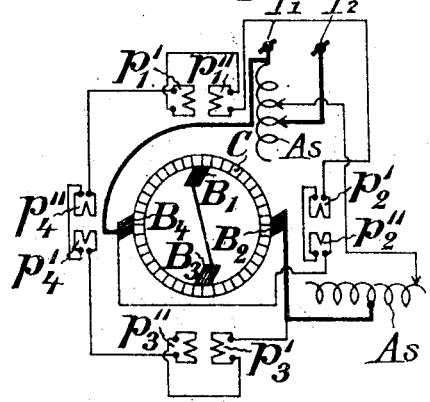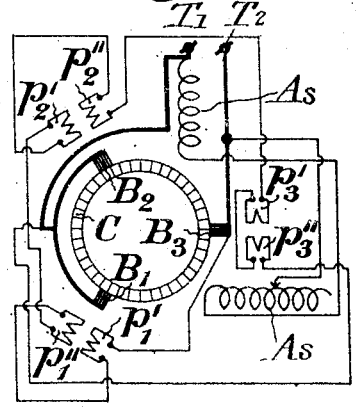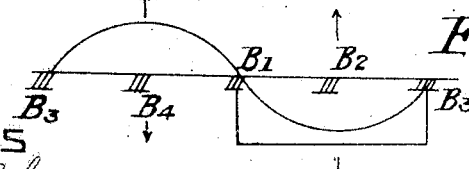

UNITED STATES PATENT OFFICE.

WLADIMIR DOINIKOFF, OF KARLSRUHE, GERMANY.

ALTERNATING-CURRENT COMMUTATOR DYNAMO-ELECTRIC MACHINE.

1,038,861. Specification of Letters Patent. Patented Sept. 17, 1912.

Original application filed March 6, 1908, Serial No. 419,537. Divided and this application filed September 28, 1908. Serial No. 455,151.

*To all whom it may concern:*

Be it known that I, WLADIMIR DOINIKOFF, engineer, a subject of the Russian Emperor, residing at Karlsruhe, 74, Kaiserstrasse, Germany, have invented certain new and useful Improvements in Alternating-Current Commutator Dynamo-Electric Machines; and I do hereby declare the following to be a full, clear, and exact description of the invention, such as will enable others skilled in the art to which it appertains to make and use the same.

This application, which is a division of my former application, Serial No. 419,537, which resulted in Patent No. 907,578, dated December 22, 1908, relates to means for suppressing the sparks at the brushes of compensated single-phase dynamo electric machines. In said patent, there is shown and described means for the general purpose indicated, applied to single-phase dynamo electric machines, involving a somewhat more complicated arrangement of compensating devices, more particularly exemplified in Figures 11, 14 and 17 of said patent. Each of said compensating devices, as illustrated in the patent, includes a transformer which supplies current to the windings of the commutating poles connected with said poles, in accordance with a definite rule laid down in said patent, to wit, the connections between the windings on the said transformer and the exciting windings for the commutating poles lying between the ends of chords which are turned through an angle of 90°, increased or diminished to the extent of approximately a segment breadth plus half a brush breadth from the axis of the brushes, relatively to the connecting points of the brush connections. As described in the original specification of the patent aforesaid, the present invention relates to a greatly simplified means for supplying the exciting windings to the compensating poles of compensated single-phase machines, without involving the application of a transformer and the consequent displacement of the connections between said transformer and the brushes with respect to the axis of the brushes.

The invention is illustrated in the accompanying drawings, in which,

Figs. 1, 2, 3 and 4 are diagrammatic representations of the application of the invention to compensated single-phase dynamo electric machines. Fig. 5 is a complete diagram of a machine involving the invention. Fig. 6 is a diagram of the commutator potential curve developed by a machine of the type shown in Fig. 3.

The present invention is directed to compensated single phase dynamo electric machines, in which at least one pair of brushes is short-circuited, so that, unlike certain of the machines described in the prior patent aforesaid, the commutator potential curve does not rotate, but, on the other hand, takes the form of an ordinary sign curve whose ordinates pulsate in uniform phase, as indicated in Fig. 6.

In the types of machines shown in Figs. 1 and 3, each of which are provided with four brushes, $B_1$, $B_2$, $B_3$, $B_4$, coöperating with commutator C, $T_1$, $T_2$ indicate the line terminals, $A_s$ the stator or field winding, the armature winding being omitted to avoid complication, and the two brushes $B_1$ and $B_3$ being short-circuited, said brushes being located permanently at the same points of the commutator potential curve, as indicated in Fig. 6. In the modification shown in Figs. 2 and 4, each of which involves three brushes $B_1$, $B_2$, $B_3$ coöperating with commutator C, brushes $B_1$ and $B_2$ are short-circuited. Each of these figures may, therefore, be regarded as a diagrammatic presentation of well known types of compensated single phase machines, in which at least two brushes are short-circuited.

Inasmuch as the same principle of construction and operation is present in the several modifications of the machine, indicated in the first four figures, a description of the complete construction and operation of the compensating means as applied to one of the machines, will suffice to illustrate corresponding compensating means, as applied to the other modified machines.

As indicated, Fig. 5 is a diagram of a complete machine involving the arrangenent of compensating device according to the invention.

In Fig. 5, $A_s$ indicates the stator or field windings, A the main armature or rotor winding, $A_h$ an auxiliary armature, preferably in the form of a laminated ring, having windings thereon which are connected to the coils of the rotor winding A and the segments of the commutator C respectively, and which are influenced by the commutating poles in such a manner that the commutator curve at the places where the brushes are located, is flattened, which has the effect of preventing a short-circuit current between the two edges of each brush, which current would give rise to sparking, as particularly set forth in my patent aforesaid. The commutating poles $p'_1$, $p''_1$, $p'_2$, $p''_2$, $p'_3$, $p''_3$, $p'_4$, $p''_4$, as indicated, are located in pairs over the brushes $B_1$, $B_2$, $B_3$, $B_4$, respectively, and serve to diminish the influence of the commutation of the brush current and in a large measure to suppress sparking at the brushes.

$T_1$ and $T_2$ are the terminals of the machine, the former of which is connected to the field winding, which in turn is connected to brush $B_2$, the latter terminal $T_2$ being connected directly with brush $B_4$, so that the course of the current is from terminal $T_1$ through the stator winding $A_s$, brush $B_2$, windings on auxiliary armature $A_h$, rotor winding A, brush $B_4$ to terminal $T_2$, and conversely. As indicated in the diagram, the exciting windings of the several commutating poles are in series with each other, and are connected in parallel between the leads of the brushes $B_2$ and $B_4$, so that the exciting current for the compensating pole windings is supplied by a current having a potential difference equal to that of the brushes $B_2$ and $B_4$, which are at the summits or flattest parts of the commutator potential curve. Because of this latter condition, the number of turns on the poles opposite the brushes $B_2$ and $B_4$ is less than that on the poles opposite brushes $B_1$ and $B_3$. By properly proportioning the number of turns of the windings of the respective commutator poles, the correction by the lateral displacement of the commutator poles, as indicated in the parent case, may be obviated.

Under certain conditions, it may not be found necessary to provide compensating poles for the exciting brushes $B_2$ and $B_4$, in which event, the construction diagrammatically indicated in Fig. 1 may be followed, the machine being in all other respects similar to that indicated in Fig. 3.

When machines of the types shown in Figs. 2 and 4 are employed, said machines having three brushes, two of which are short-circuited, compensating poles may be provided for each of the brushes, as indicated in Fig. 4, or, in the alternative, compensating poles may be provided for the short-circuited brushes $B_1$ and $B_2$ only, as indicated in Fig. 2, in each case, however, the exciting windings for the compensating poles receive current from brush $B_3$ and the short-circuit connection between brushes $B_1$ and $B_2$, the several compensating pole windings, in both forms of the apparatus being in series.

Obviously, the branching points of the exciting windings of the commutating poles in the several modifications may be located at any points of the commutator, which are at a sufficient potential difference to energize the said windings to effect the desired result, and therefore, the displacement of these branching points through an angle of 90° is not necessary, in the several forms of the invention illustrated, in which particular, the present invention is distinguished from the specific forms of the invention as disclosed in my prior Letters Patent aforesaid, and furthermore, the exciting current for the compensating poles may be derived directly from the working commutator brushes for the main leads of the machine without the interposition of a transformer, such as was employed in the same general type of machine in the patent aforesaid.

What I claim is:—

1. Mechanism for preventing sparking at the brushes of compensated single phase dynamo electric machines, having two short circuited brushes, a main armature winding, a commutator, connecting wires between the said winding and commutator; comprising an auxiliary armature iron core, upon which the said connecting wires are wound, commutating poles, adapted to influence the said connecting wires in such a manner that the commutator potential curve at the places where the brushes are situated is flattened, windings on the said commutating poles, and direct connections between the windings of the said commutating poles and the said commutator, the said windings being in series between points of the said commutator which are at a sufficient potential difference for feeding the said windings.

2. Mechanism for preventing sparking at the brushes of compensated single phase dynamo electric machines, having a main armature winding, a commutator, two pairs of brushes, one of said pairs being short circuited, connecting wires between the said winding and commutator; comprising an auxiliary armature iron core upon which the said connecting wires are wound, commutating poles adapted to influence the said connecting wires in such a manner that the commutator potential curve at the places where the brushes are situated is flattened, windings on the said commutating poles, and direct connections between the windings of the said commutating poles and the said commutator, the said windings being in series between points of the said commutator which are at a sufficient potential difference for feeding the said windings, the number of ampere turns in the windings of the poles adjacent the short circuited brushes being greater than that of the other poles.

In testimony whereof I have affixed my signature, in presence of two witnesses.

WLADIMIR DOINIKOFF.

Witnesses:
 N. R. Shank,
 Jos. H. Leute.